United States Patent Office 3,040,314
Patented June 19, 1962

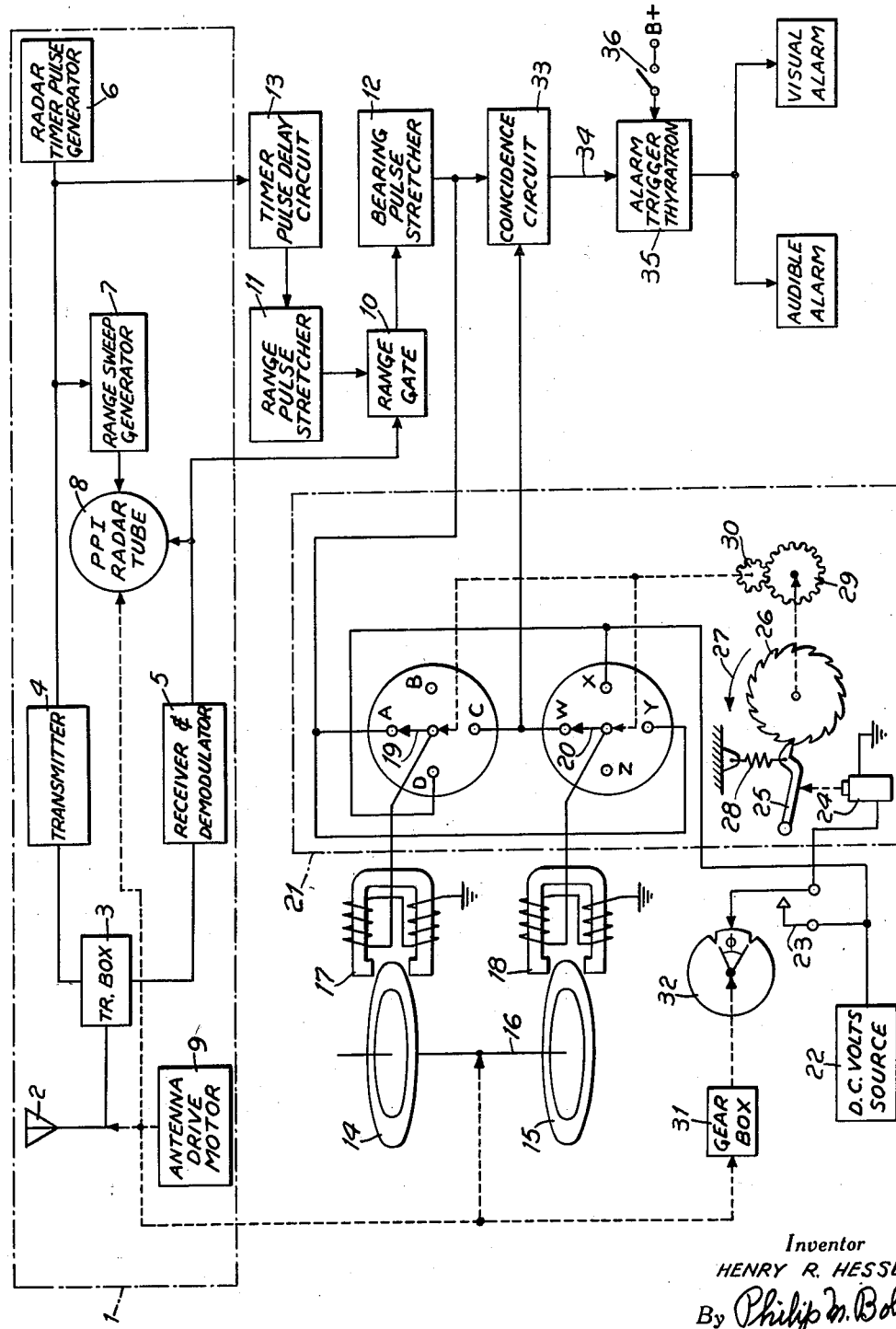

3,040,314
COLLISION COURSE WARNING DEVICE
Henry R. Hesse, East Paterson, N.J., assignor to International Telephone and Telegraph Corporation, Nutley, N.J., a corporation of Maryland
Filed Dec. 3, 1957, Ser. No. 700,437
5 Claims. (Cl. 343—17.1)

This invention relates to a collision course warning device and in particular to a device to be employed in conjunction with a PPI-type pulse scan radar system.

In the past shipborne radar having a 360-degree sweep has been employed to detect the presence of other vessels in the vicinity and to yield a PPI-type display which can be monitored by an operator. In many instances the operator relays information concerning other vessels in the vicinity to personnel engaged in navigation and control of the ship. In such cases it is particularly important that the operator note which, if any, other vessels are moving on a collision course with his own. This requires continual alertness by the operator and is particularly difficult when his ship is moving through areas of high traffic density.

In other mediums of transport the same problem is encountered as, for example, in aircraft. The radar operator in an aircraft having PPI-type scan radar to detect and indicate the positions of other aircraft in the vicinity must be extremely alert to detect and give warning to his pilot that other aircraft are on a collision course with his own. Here the problem is even more acute than in the case of surface craft due to the greater speeds involved.

An object of this invention is to provide an automatic system to detect when one body moves on a collision course or a near collision course with another body, particularly one which gives an alarm when this occurs.

Another object is to provide such a warning system in conjunction with a PPI-type radar scan system.

Another object is to provide a collision course warning system detecting constant bearing courses of one craft with other craft in the vicinity, said system having at all times a record of the relative bearings of other craft in the vicinity at a previous time, as well as means to detect the instantaneous relative bearings of other craft.

When a craft moves on a collision course with another craft and each craft is traveling at a constant speed and in a straight line, it is a well-known fact that each will maintain a constant bearing with regard to the other. The angular relationship formed by the instantaneous position of each ship and their future point of collision will remain constant until collision. Therefore, an observer on one craft, noting that another craft has the same relative bearing over a period of time, can reasonably assume that his own craft is on a collision course with that other craft, and he can take proper action to avoid a collision. This known relationship between constant relative bearing and collision course is employed in this invention.

It is a feature of this invention to employ memory devices to record the relative bearings of all craft in a given vicinity at a particular time with regard to one chosen craft and to later compare the recorded bearing information with instantaneous bearing information so that an alarm may be energized when recorded bearing and instantaneous bearing coincide.

In accordance with another feature of this invention, magnetic-type memory devices are employed in conjunction with a pulse-type PPI radar scan system to alternately record bearing information on each of two memory devices, alternately compare recorded bearing information from each memory device with instantaneous bearing information, and alternately erase bearing information from each memory device so that there is at all times a record of previous relative bearings to other craft available for comparison.

It is another feature of this invention to employ pulse stretching means to stretch pulses indicative of instantaneous bearing so that, upon comparing instantaneous bearing pulses with stored bearing pulses, an alarm may be energized when a near collision or collision course exists.

It is a further feature of this invention to employ a coincidence circuit for comparing stored bearing pulses with instantaneous bearing pulses which triggers a thyratron circuit energizing audio and visual alarms when coincidence occurs and to provide a manually operated switch to de-energize the thyratron circuit.

Other and further features and objects of this invention will be more apparent from the following description of a specific embodiment taken in reference to the drawing, in which the figure is a schematic and block diagram of a collision course warning device.

In the figure there is shown a pulse-type radar system 1 comprised of a transmitting and receiving antenna 2 coupled to TR box 3, which is in turn coupled to transmitter 4 and receiver and demodulator 5. Transmitter 4 is keyed by sync pulses from radar timer 6. These same sync pulses are fed to range sweep generator 7. The output of range sweep generator 7 is fed to PPI radar tube 8 to cause range sweep on that tube. The output of receiver and demodulator 5, comprising pulses reflected from other craft, is fed to control the intensity of the beam of tube 8 to cause illuminated spots on the face of that tube indicative of the relative positions of other craft. Antenna drive motor 9 drives antenna 2 continuously in one direction through 360 degrees. The output of this motor is also coupled to PPI radar tube 8 causing bearing sweep on that tube. In operation pulses reflected from other craft in the vicinity and received by antenna 2 are amplified and demodulated by 5 and fed to range gate 10, which is controlled by the output of range pulse stretcher 11, so that only those pulses reflected from craft within a predetermined range pass from range gate 10 to bearing pulse stretcher 12. Range pulse stretcher 11 receives delayed pulses from timer pulse delay circuit 13 which in turn receives pulses from radar timer 6. The delay time of timer pulse delay circuit 13 is indicative of the range desired for the collision course warning system. The delayed pulses from circuit 13 are stretched by pulse stretcher 11 so that they may be employed to gate out, in range gate 10, all reflected pulses from craft beyond the desired range. The above described components except for range gate 10, delay circuit 13, range pulse stretcher 11 and bearing pulse stretcher 12 pertain to a typical pulse-type radar system of which there are many varieties which would suffice in this application.

Magnetic-type pulse recording devices 14 and 15, which may be disk-shaped as shown and having magnetically sensitive material along their perimeters, are mechanically coupled to the output of antenna drive motor 9 so that each turns about an axis 16 through its center at the same rate as antenna 2. Magnetic recording devices 14 and 15 are inductively coupled at their perimeters with electromagnetic recording and reading heads 17 and 18, respectively, so that when the heads are energized by D.C. pulses, the pulses are recorded magnetically on the magnetic recorders at points on the perimeters of the recorders. These electromagnetic heads also serve to detect or read magnetized points on the perimeters of their associated magnetic recording devices to yield D.C. pulses as the magnetic recorders are rotated. The coils of electromagnetic heads 17 and 18 are coupled to the rotating arms 19 and 20 of non-homing type rotary stepping switch 21. Each of these switch arms steps four times to four different terminals in a fixed sequence to complete a cycle.

The arms of stepping switch 21 are caused to step each time the switch is fed a D.C. pulse from D.C. source 22 via microswitch 23. The actuating mechanism and operation of stepping switch 21 may be as shown in the figure or as described in chapter 9 of "Design of Switching Circuits" by Keister, Ritchie and Washburn, published in 1951 by Van Nostrand Co., Inc. of New York. As shown in the figure, D.C. pulses from microswitch 23 are applied to solenoid 24, which is mechanically coupled to pawl 25 so that pawl 25 advances ratchet 26 in the direction of arrow 27 when solenoid 24 is energized. Spring 28 is provided to cause pawl 25 to engage the next tooth on ratchet 26 after each advance of the ratchet. Gear 29 is mechanically coupled to ratchet 26 and turns at the same rate as the ratchet, and gear 30 is directly engaged at its perimeter to the perimeter of gear 29, while gear 30 is directly coupled in a one-to-one fashion to rotating switch arms 19 and 20 of stepping switch 21. The ratio of gear 30 to gear 29 is the same as the ratio of four to the number of teeth on ratchet 26. The four terminals on switch 21 contacted by arm 19 are A, B, C, and D, and the four terminals contacted by arm 20 are W, X, Y, and Z. Terminals A and Y are coupled together as are terminals C and W and terminals D and X. Terminals B and Z are dummies.

The output from antenna drive motor 9 is mechanically coupled to reduction gear box 31, which preferably reduces rotation rate by at least a factor of two. The output from gear box 31 is mechanically coupled to cam 32. As cam 32 rotates through 360 degrees, it causes microswitch 23 to close momentarily twice and the smaller angle through which cam 32 rotates between closings of microswitch 23, indicated by the angle $\theta$, must be the same ratio to 360 degrees as the reciprocal of the reduction gear box ratio. Thus, each time microswitch 23 closes momentarily due to the rotation of cam 32, a D.C. pulse from D.C. source 22 is applied to solenoid 24 of rotary stepping switch 21 causing each of the arms, 19 and 20, to step in the same direction to its next terminal.

As stepping switch 21 steps in the clockwise direction as shown in the figure, each of its arms, 19 and 20, successively couples successive terminals with the coil of its associated electromagnetic head. For example, when arm 19 is at terminal A, then arm 20 is at W, and since the output from bearing pulse stretcher 12 is coupled to terminal A, pulses in that output will be applied to the coil of electromagnetic head 17 and magnetically recorded on magnetic recorder 14. Meanwhile, pulses previously recorded on magnetic recorder 15 will be detected by electromagnetic head 18 and fed via arm 20 to terminal W. Since terminals W and C are coupled to coincidence circuit 33, as is the output from pulse stretcher 12, the pulses from magnetic recorder 15 will be applied to coincidence circuit 33, where they will be time compared with pulses from stretcher 12. When arm 19 steps to terminal B and arm 20 steps to terminal X, a D.C. signal from D.C. source 22 is applied to electromagnetic head 18 erasing any pulses previously recorded on magnetic recorder 15. Subsequently, when arm 19 steps to terminal C and arm 20 steps to terminal Y, pulses recorded on magnetic recorder 14 and detected by electromagnetic head 17 will be applied to terminal C and thence to coincidence circuit 33. Meanwhile pulses from pulse stretcher 12 applied to terminal Y will energize electromagnetic head 18 via arm 20 and will be recorded on magnetic recorder 15. Subsequently, when arm 19 steps to terminal D and arm 20 steps to terminal Z, a D.C. signal from source 22 will be applied via arm 19 to electromagnetic head 17 erasing pulses previously recorded on magnetic recorder 14. Subsequently, arm 19 will step to terminal A and arm 20 will step to terminal W repeating the above described process.

From the above description of the operation of non-homing type rotary stepping switch 21, it is evident that bearing pulses indicative of previous relative bearings to other craft within a predetermined range will be recorded on one or the other of magnetic recorders 14 or 15 at all times. Furthermore, it is evident that while one set of bearing pulses indicative of previous relative bearings to other craft and which have been stored on one recorder are being compared in coincidence circuit 33 with instantaneously received pulses, indicative of present relative bearings to those same craft, the other magnetic recorder will be recording the same instantaneously received pulses. The number of rotations which radar antenna 2 makes between the time the pulses are recorded on a magnetic recorder and the time those same recorded pulses are compared in coincidence circuit 33 with received pulses may be adjusted. This number of rotations and thus the time between recording and comparing should be established in consideration of the relative velocity of other craft in the vicinity, the range to other craft, and the degree of advanced warning required to avoid collisions. In order to change this time, say to increase it, it is merely required that the reduction ratio of reduction gear box 31 be increased and the angle $\theta$ between depressions on cam 32 be adjusted so that $\theta$ is the same ratio to 360 degrees as the reciprocal of the increased reduction gear box ratio.

The recorded and received pulses which have both been subject to a degree of stretching by pulse stretcher 12 are compared in coincidence circuit 33. When these compared pulses coincide in time, a signal is fed via line 34 to alarm trigger thyratron 35 causing this thyratron to fire, provided manual switch 36 is closed so as to apply B+ to the thyratron. The output of thyratron 35 is coupled to audible alarm 37 and visual alarm 38, so that these alarms are actuated when the thyratron is triggered. When these alarms are energized, they effectively indicate to the PPI radar tube operator that another craft, within a predetermined range, as established by delay circuit 13, is on a collision course or near collision course with his own. This operator, upon observing his PPI radar tube subsequently, for a brief period of time, will be able to determine which other craft in the vicinity is on a collision course with his own and relay this information with the relative bearing and range to that craft to those concerned with navigation and control of his own craft. As an alternate action, the operator might open switch 36 removing B+ from thyratron 35 and de-energizing the alarms after an alarm has occurred. Subsequently, the operator would close switch 36 arming the thyratron and observe the PPI radar tube bearing sweep, noting the position of the sweep when the alarms are next energized. With this information he will be able to identify quickly at least the relative bearing to the craft on a collision course with his own and inform those in control.

While I have described a specific embodiment of my invention, it is obvious that other components may be substituted for those described by one familiar with the art without deviating from the spirit or scope of the invention, and that various modifications may be made therein which are in the true spirit and scope of the invention as defined in the appending claims.

I claim:

1. A collision course detecting system for use with a PPI pulse-type radar system comprising multiple magnetic-type storage means mechanically synchronized with the motion of the antenna of said radar system, magnetic-type recording, reading, and erasing heads associated with each storage means, a non-homing type rotary switch having multiple arms each of which is coupled to a different one of said magnetic heads, means coupling said non-homing type rotary switch with the antenna drive of said radar system so that the arms of said switch are caused to step together from one associated terminal to another in a predetermined manner, means to time compare stored pulses from a prior time with instantaneous return pulses from said radar system producing an output indicative of time coincidence of compared pulses, means coupling each of said arms of said stepping switch with a different one of said magnetic heads, means coupling certain of said terminals with a source of erasing signal, means coupling others of said terminals with said means to compare, and means coupling different others of said terminals with said return signals from said radar system so that return pulses from said radar system are alternately recorded in a predetermined manner on said multiple magnetic-type storage means and said stored pulses from said magnetic-type storage means are alternately compared with detected pulses from said radar system and stored pulses on said multiple magnetic-type storage means are alternately erased.

2. A system to detect the occurrence of collision or near collision courses of one craft relative to one or more other craft for use with a PPI pulse-type radar system comprising multiple magnetic-type storage means each in rotary synchronism with the motion of the antenna of said radar system, different magnetic heads for recording, reading and erasing pulses on each of said multiple magnetic-type storage means, means coupled to return pulses from said radar system to range gate the pulses blocking returned pulses from beyond a predetermined range, pulse stretching means coupled with said range gating means to stretch return pulses from said radar system a predetermined amount, time coincidence means to compare pulses stored on said multiple magnetic-type storage means with stretched pulses from said pulse stretching means producing an output indicative of the occurrence of a collision or near collision course between said one craft and one or more other craft, a non-homing type rotary stepping switch having an arm and associated terminals for each of said magnetic-type storage means, means coupling each switch arm with a different one of said magnetic heads, means coupling certain terminals associated with each arm with the output of said pulse stretcher, means coupling other terminals associated with each arm to said coincidence means or to a source of erasing signal and means coupling said non-homing type rotary stepping switch with the antenna drive of said radar system in such a manner that pulses from said stretching means are alternately recorded by said magnetic heads in a predetermined manner on each of said magnetic-type storage means, pulses are alternately detected and pulses are alternately read from each magnetic storage means by its associated magnetic head and fed to said coincidence means and pulses recorded on each storage means are alternately erased.

3. A collision or near collision course system for use with a PPI-type pulse radar system identical to that claimed in claim 2 and including alarm means coupled to the output of said coincidence means and energized when a collision or near collision course occurs between said one craft and one or more other craft and including means to disarm said alarm.

4. A collision course detecting system for use with a radar system comprising multiple magnetic-type storage means mechanically synchronized with the motion of the antenna of said radar system, magnetic-type recording, reading and erasing heads associated with each storage means, a non-homing type rotary switch having multiple arms each of which is coupled to a different one of said magnetic heads, means coupling said non-homing type rotary switch with the antenna drive of said radar system so that the arms of said switch are caused to step together from one associated terminal to another in a predetermined manner, a coincidence circuit coupled to said radar system and said storage means to time compare stored signals from a prior time with instantaneous return signals from said radar system producing an output indicative of time coincidence, means coupling certain af said terminals with a source of erasing signal, means coupling others of said terminals with said coincidence circuit, and means coupling different others of said terminals with said return signals from said radar system so that return signals from said radar system are alternately recorded in a predetermined manner on said multiple magnetic-type storage means and said stored signals from said magnetic-type storage means are alternately time-compared with detected signals from said radar system and stored signals on said multiple magnetic-type storage means are alternately erased.

5. A collision course detection system comprising means to detect the relative bearing of one craft with respect to another craft, multiple bearing information storage means for storing said detected relative bearing information, a time-comparison circuit for time-comparing two signals and producing an output solely upon coincidence thereof, switching means simultaneously coupling said detector with one of said multiple storage means to write said detected relative bearing information therein while simultaneously coupling another of said multiple storage means to said time-comparison circuit for writing out previously stored relative bearing information therefrom, said switching means being adapted during a subsequent switching operation to couple said one storage means to said comparison circuit to read out the information therefrom while simultaneously coupling said detector to another of said multiple storage means for storing said detected relative bearing, means coupling said detector to said time-comparison circuit whereby coincidence of directly detected bearing information and stored bearing information produce an output, means for producing a perceptible signal, and means independent of said storage means coupling the output of said time-comparison circuit to said signal producing means.

References Cited in the file of this patent
UNITED STATES PATENTS 2,410,424    Brown _____ Nov. 5, 1946
2,702,356    Flory _____ Feb. 15, 1955